United States Patent [19]
Dupuy

[11] Patent Number: 5,774,790
[45] Date of Patent: Jun. 30, 1998

[54] SECTORIZED CELLULAR MOBILE RADIO SYSTEM WITH SECTOR SIGNALLING AND CONTROL IN PREDETERMINED TIME SLOTS

[75] Inventor: Pierre Dupuy, Paris, France

[73] Assignee: Alcatel N.V., Amsterdam, Netherlands

[21] Appl. No.: 729,320

[22] Filed: Oct. 15, 1996

Related U.S. Application Data

[63] Continuation of Ser. No. 277,976, Jul. 20, 1994, abandoned.

[30] Foreign Application Priority Data

Jul. 30, 1993 [FR] France .................................. 93 09424

[51] Int. Cl.[6] ..................................................... H04Q 7/00
[52] U.S. Cl. ........................ 455/33.1; 455/34.1; 455/53.1
[58] Field of Search .................................. 455/33.1, 33.3, 455/34.1, 51.1, 53.1, 103; 370/95.1, 95.3

[56] References Cited

U.S. PATENT DOCUMENTS 5,185,739  2/1993  Spear ...................................... 370/95.3
5,228,029  7/1993  Kotzin .................................... 370/95.1

FOREIGN PATENT DOCUMENTS

0444485A2  9/1991  European Pat. Off. .
0534612A2  3/1993  European Pat. Off. .
WO9101073  1/1991  WIPO .

*Primary Examiner*—Reinhard J. Eisenzopf
*Assistant Examiner*—Marsha D. Banks-Herold
*Attorney, Agent, or Firm*—Sughrue, Mion, Zinn, Macpeak, and Seas.

[57] ABSTRACT

A cellular mobile radio system comprises cells divided into P sectors each having its own timebase. The system uses time division multiple access and accordingly transmission is effected in bursts each transmitted during a time slot, or channel time slot, of predetermined rank relative to a reference of the timebase of the sector concerned. N time slots form a frame which repeats periodically. A control channel is reserved for each sector for transmitting signalling and control data, a different control channel being associated with each sector. The timebase of each sector is shifted a predetermined number of time slots relative to the timebases of the other sectors of the same cell. The offsets are such that the control channels relating to each sector are conveyed at different times.

8 Claims, 2 Drawing Sheets

CELL STRUCTURE

CELL STRUCTURE

FRAME STRUCTURE 5,774,790

SECTORIZED CELLULAR MOBILE RADIO SYSTEM WITH SECTOR SIGNALLING AND CONTROL IN PREDETERMINED TIME SLOTS

This is Continuation of application Ser. No. 08/277,976, filed on Jul. 20, 1994, now abandoned.

BACKGROUND OF THE INVENTION

1. Field of the invention

The present invention concerns a cellular mobile radio system, in particular a system of the GSM type (Global System for Mobile communications).

2. Description of the prior art

A GSM type cellular mobile radio network includes a plurality of geographically dispersed base transceiver stations. Each base transceiver station provides radio coverage of a specific geographical area or cell. Each base transceiver station is usually at the center of the respective cell; the expression Base Transceiver Station is abbreviated to BTS.

Thus the overall coverage area is divided into cells and a mobile (such as a mobile telephone, for example) in the area covered by a network of base transceiver stations can at all times access a particular cell to exchange data (usually speech) and signalling and control information by radio with the base transceiver station of the cell in which it is currently located.

When a mobile user wishes to set up a call to another mobile user or a fixed user, i.e. to transmit and receive speech, the respective base transceiver station acts as a relay station and to this end has at least one transmitter and at least one receiver associated with at least one antenna.

The BTS antenna can be an omni-directional antenna transmitting high power signals in all directions.

However, signals received by a non-directional antenna are of poorer quality than signals received by a highly directional antenna. Consequently, the signals transmitted by the mobiles must be transmitted at a high level in order to be usable by a BTS having an omni-directional antenna.

The level at which mobiles transmit is limited, among other reasons to increase the length of time for which they can operate between battery recharging, with the result that if they are too far from the center of the cell, reception at the BTS is poor, the signal being at too low a level to be distinguished from interference or noise.

One method of overcoming this drawback is to divide the cells, especially large area cells (having a radius in the order of several kilometers), into a plurality of sectors grouped around the BTS of the original cell, referred to as the main cell. In this way a cell can be divided into three, six or 12 sectors, for example, depending on its size, the call traffic in the area it covers and the power output of the mobiles from which it must be able to receive.

Each sector then has a directional antenna. For convenience, the combination of all the sectors will continue to be referred to as a cell, although each sector in fact constitutes an independent cell in the sense as defined above.

Two main types of data, of the kind exchanged on the ISDN (Integrated Services Digital Network) can be exchanged between a mobile and the base transceiver station of the cell in which it is located:

speech (or computer) data, and signalling and control data, which includes information enabling the mobile to access the cellular network or to maintain a call in progress on changing from one cell to another ("Handover" in GSM terminology).

Thus each main cell is associated with a set of frequencies including at least one frequency pair comprising:

a frequency for transmission in the downward direction i.e. from the base transceiver station to the mobile) of signalling and control data on a channel called the broadcast control channel (BCCH) in GSM terminology and wanted data, a frequency associated with the downward frequency for transmission in the upward direction (i.e. from the mobile to the base transceiver station) of signalling and control data and wanted data.

Depending on the capacity required of the cell, i.e. depending on the expected call traffic in the cell, one or more additional frequencies, all different from each other and from the frequency initially provided, are assigned to the cell to support traffic requirements, i.e. to transmit wanted data. Of course, each time that an additional frequency is used in the downward direction, an associated frequency is provided for transmission in the upward direction.

The upward and downward frequencies are always different.

In the case of sectored cells, a single frequency is usually used and each sector has a transmitter, a receiver and an antenna.

Because GSM type mobile radio systems use the principle of time division multiple access (TDMA), when a mobile accesses the cellular network a traffic channel (TCH) is assigned to it for transmission of wanted data, this traffic channel corresponding to a transmit time slot which is repeated periodically and is reserved to the mobile throughout the duration of the call, i.e. the duration of exchange of wanted data on the upward frequency. A corresponding traffic channel is assigned to it in the same way for receiving on the downward frequency. The upward traffic channel is offset in time relative to the downward traffic channel.

In the simplest configuration the channels conveyed by a frequency in practice form groups of eight called frames, with the result that a given channel is repeated every eight time slots. One of these channels, called the control channel, is reserved for transmission of signalling and control data. Its repetition period is greater than the repetition period of the traffic channels, which is eight time slots. Accordingly, the time slots reserved for the control channel and which are not used for signalling and control are also available to carry traffic.

In rural regions, where the cells usually cover a large area, and are therefore divided into sectors, many traffic channels are therefore available (usually seven per sector, i.e. 14 or 21 for cells with two or three sectors, respectively) and in practise very few are used because of the very low call density. The availability of at least one pair of control frequencies per sector requires each sector to be provided with a transmitter and a receiver, and all the necessary associated equipment.

Consequently, the equipment overhead is high for a low use of capacity, with the result that investment in a system of this kind is not cost effective.

Patent application EP-A-0 359 535 describes a cellular mobile radio system using "floating" channels that can be allocated dynamically to one sector or another in response to overloading of normally available channels. The system cannot reduce the equipment overhead of a sectored cell as it requires one transceiver per sector and at least one "floating" transceiver to make the "floating" channels available through the intermediary of an additional frequency allocated to the overloaded sector.

Patent application WO 91/01073 discloses a cellular mobile radio system using time division multiple access in which the various sectors of a sectored cell are grouped in pairs, two sectors grouped together in this way sharing the time slots available on the frequency or frequencies allocated to them, according to the demand, i.e. according to the call traffic in each sector. In this case the time slots are said to be allocated dynamically between the sectors of the same group.

The problem that arises with a system of this kind is that, in the upward direction, the control channel for each sector of a pair is either identical for both sectors or transmitted at the same time for each of the two sectors, with the result that the control channel of one sector interferes with the control channel of the other, which renders this channel unusable. Similarly, if the mobiles in either of the sectors in a pair transmit access signals on the upward control channel, these signals are sent at the same time and also interfere with each other.

In the system proposed in this prior art document a receiver is required for each sector, with the result that the equipment overhead of a system of this kind is still high.

Finally, patent application EP-A-0 444 485 corresponding to U.S. Pat. No. 5,288,029 (Kotzin) proposes to reduce the number of transcoders used in order to reduce the equipment overhead in a synchronized cell system and, to this end, to shift by an integer number of frames the timebases of each cell synchronized relative to the others. Given that the duration of a frame is substantially equal to the time required by the transcoder to process the speech, a system of this kind enables the use of a single transcoder for several synchronized cells.

However, this system cannot reduce the number of receivers used in a sectored cell, with the result that the equipment overhead of a system of this kind remains high. Since the offset is by an integer number of frames, channels of the same rank would be superposed in the various sectors, with the result that one transmitter and one receiver per sector would be required to avoid loss of data.

An object of the present invention is to provide a cellular mobile radio system enabling the equipment overhead of the base transceiver station to be reduced whilst assuring sufficient traffic channel availability to cover the call traffic in a sectored cell, so avoiding the superposition of control channels with the risk of rendering the information contained in the latter unusable.

SUMMARY OF THE INVENTION

To this end, the present invention proposes a cellular mobile radio system comprising cells divided into P sectors each having its own timebase, the transmission of data in said system using the time division multiple access procedure and being accordingly effected in bursts each transmitted during a time slot, or channel time slot, of predetermined rank relative to a reference of the timebase of the sector concerned, N time slots forming a frame which repeats periodically, and a control channel is reserved for each sector for transmitting signalling and control data, a different control channel being associated with each sector, in which system the timebase of each sector is shifted a predetermined number of time slots relative to the timebases of the other sectors of the same cell and the offsets are such that the control channels relating to each sector are conveyed at different times.

Because of this offset between the timebases of the various sectors, it is possible to offset in time the signalling and control data receive and transmit times. Thus the same baseband unit can control the transmission and the reception of this data, which is not generated at the same time for the various sectors. It is therefore possible to use only one receiver, for example: the timebases being offset in time, the signalling or control data transmitted by the mobiles (constituting the random access channel (RACH) transmitted by a mobile which requires to access a particular sector) in different sectors are therefore received at different times, with no risk of collision and loss of data.

In the simplest configuration a single baseband unit (or baseband device) with frames comprising eight time slots can therefore handle all of the traffic of the sectored cell. In this case, if the number of sectors in the sectored cell is three, for example, three time slots of the transmit frame are reserved for transmitting control and signalling data and the other time slots carry the traffic for all of the sectored cell.

Consequently, by virtue of the offset between the timebases of the sectors, the equipment overhead can be reduced because it is possible for the sectors not to use the same time slots at the same time.

In the cellular mobile radio system of the invention P is with very great advantage less than N, P time slots of the N time slots of each frame are reserved for the control channels and some of the remaining N-P channels, referred to as traffic channels, are associated with different sectors either in a manner that is predefined and invariant or in a dynamic manner dependent on demand, i.e. on the call traffic.

In a first embodiment of the present invention, the system of the invention further comprises, in association with each sectored cell and for exchanging data with mobiles in said cell, a base transceiver station including:

P antennas, one for each sector, a receiver adapted to be switched in each time slot by switching means controlled by control means of said base transceiver station, said control means knowing the relationship of the traffic channels to the sectors at the antenna of the sector with which is associated the traffic or control channel corresponding to the time slot concerned, to receive data from a mobile in that sector, P transmitters, one for each sector, for transmitting data to be transmitted to the mobiles in the sectors with which they are associated, when there is any, or dummy bursts when there is no data to transmit.

The base transceiver station further comprises a single transmit baseband processor device connected to any of said transmitters by switching means (for example a digital switch) controlled by the control means of said base transceiver station, the latter knowing the relationship of the traffic channels to the sectors.

Thus a single receive subsystem with a single receiver can be used, significantly reducing the equipment overhead. It is, however, necessary to retain one transmitter per sector because, as is well known in connection with the GSM system in particular, the downward signalling and control channel must be transmitted continuously, among other reasons to enable the access and handover procedures. However, a single baseband device is needed to manage the baseband on transmission of wanted data.

In a second embodiment of the present invention the mobile radio system of the invention further comprises, in association with each sectored cell and for the purposes of exchanging data with mobiles in said cell, a base transceiver station including:

P antennas, one for each sector,

P receivers, one for each sector, for receiving data from a mobile in said sector, P transmitters, one for each sector, transmitting, when there is any, data to be transmitted to the mobiles in the sectors with which they are associated or dummy bursts when there is no data to transmit, a single baseband transmit processor device connected to any of said transmitters by first switching means controlled by the control means of said base transceiver station, said control means knowing the relationship of the traffic channels to the sectors, a single baseband receive processor device connected to any of said receivers by second switching means controlled by said control means.

The first and second switching means may each comprise a digital switch.

In this embodiment the reduced equipment overhead results from the fact that a single baseband transmit device and a single baseband receive device are all that is needed since each time slot is used in only one sector at a time.

Other features and advantages of the present invention emerge from the following description of a system of the invention given by way of non-limiting example only.

DETAILED DESCRIPTION OF THE PREFERRED EMBODIMENTS

Components common to all these figures always carry the same reference numbers.

Figure 1:
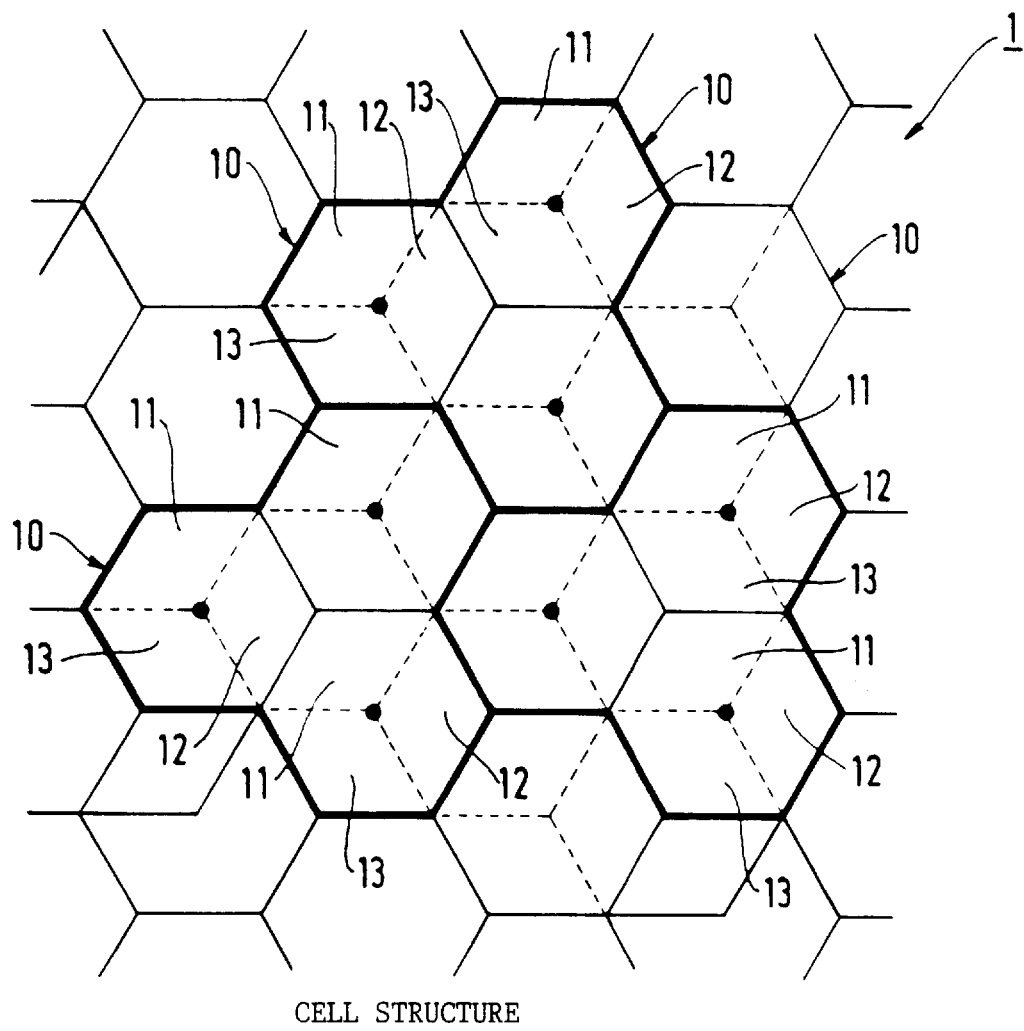
FIG. 1 is a diagram showing one example of the organization of sectored cell in a cellular mobile radio network.

FIG. 1 shows part of a cellular mobile radio network 1 symbolized by the repetition of a pattern of three cells 10 (the contours of each pattern are shown in bold line in FIG. 1). Each cell 10 is divided into three sectors 11, 12 and 13 (the boundaries between the sectors of the same cell are shown in dashed line in FIG. 1).

In the conventional way, at least one carrier frequency is assigned to each sector 11, 12 or 13, the distribution of the carrier frequencies as a function of the disposition of the sectors and the cells being chosen so that interference is minimized. This leads to choosing predetermined repetition patterns.

Each sector has a transceiver device (not shown in FIG. 1) which has its own timebase. In a mobile radio system using time division multiple access, and for the reasons explained above, it is obvious that each base transceiver station must have a time reference enabling it to perform the necessary synchronization with the mobiles for which it is responsible, so that the latter send signals in the time slots reserved for them.

Hereinafter the combination of the transmit and receive devices of the three sectors 11, 12 and 13 of a cell 10 are referred to as the base transceiver station of that cell 10.

Figure 2:
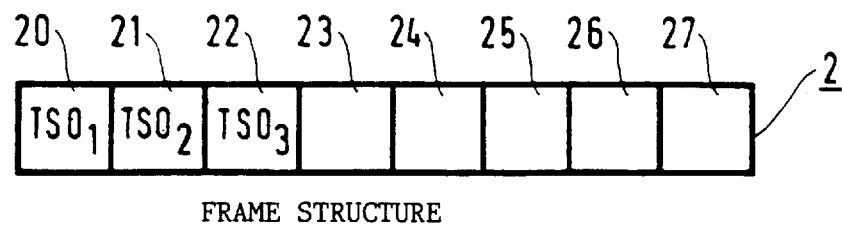
FIG. 2 is a diagram showing a frame characteristic of a system of the invention.

FIG. 2 shows a simple configuration of a frame 2 of the invention, associated with one of the cells 10. The frame 2 is symbolized by a series of eight boxes 20 through 27, each box representing one time slot.

According to the invention, the timebases of each transmit and receive device are offset in time so that, among other things, the control channels relating to each sector are conveyed at different times so that no collision between them is possible.

In the usual way, the control channel corresponds to the first time slot of the frame, which carries the number 0 and is denoted TS0.

According to the invention, and as can be seen in FIG. 2, the TS0 of each sector 11, 12 or 13 does not necessarily correspond to the first time slot of the frame 2.

In the example shown in FIG. 2 the timebase of the sector 12 is shifted one time slot relative to the timebase of the sector 11 and the timebase of the sector 13 is shifted one time slot relative to the timebase of the sector 12 and by two time slots relative to the timebase of the sector 11. Thus the respective TS0 of each sector, $TS0_1$, $TS0_2$ and $TS0_3$, corresponds to the first, second and third time slots 20, 21 and 22 of the frame 2, respectively.

The other time slots 23 to 27 of the frame 2 are reserved for traffic channels in cell 10.

There are various ways to allocate these time slots to the various sectors.

One way is for each remaining time slot to be allocated permanently to a given sector. For example, time slots 23 and 24 are allocated to sector 11, time slots 25 and 26 are allocated to sector 12 and time slot 27 is allocated to sector 13. The allocation decisions can be based on statistical data concerning call traffic in each of sectors 11, 12 and 13, for example.

A second way is for some of the remaining time slots to be allocated permanently to one or more given sectors and the other time slots to be allocated "dynamically" according to demand, i.e. to the call traffic in the cell. For example, time slots 23, 24 and 25 are allocated permanently to sectors 11, 12 and 13, respectively, and time slots 26 and 27 remain available to cope with the instantaneous demand, according to call traffic in the cell. Implementation of a solution of this kind is described below with reference to FIGS. 3 and 4.

A third method is to allocate all the remaining time slots dynamically according to the demand in each sector. The implementation of this solution is also described below.

Figure 3:
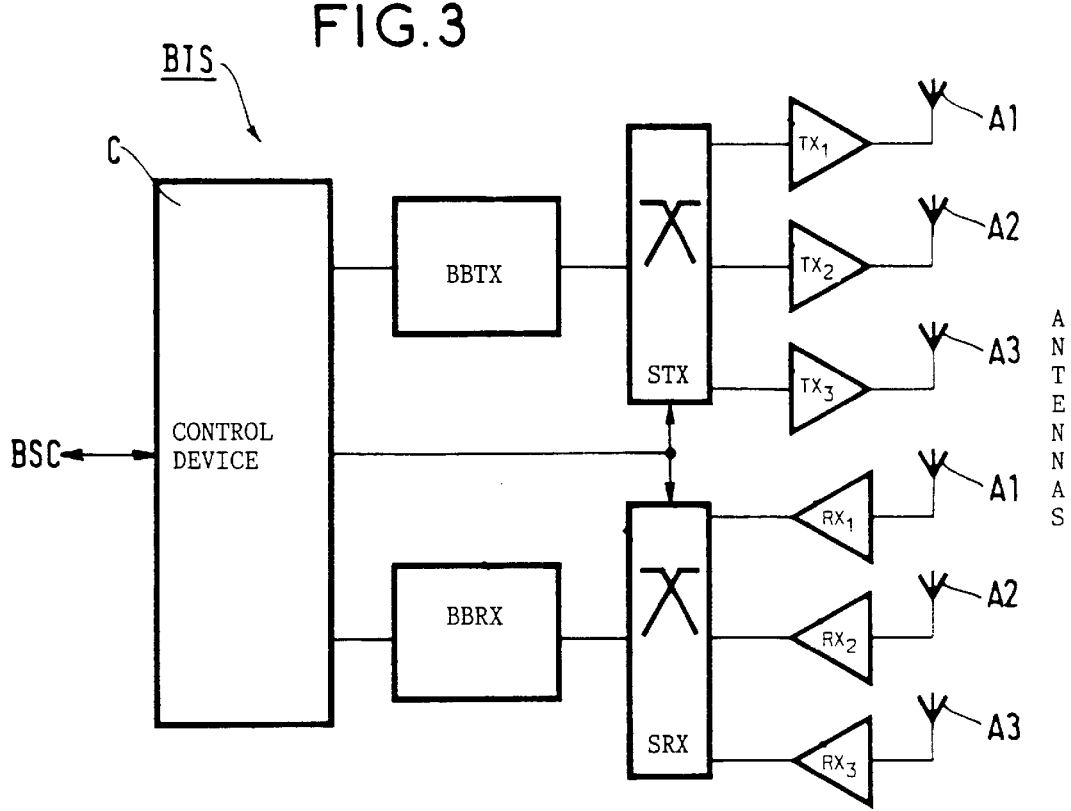
FIG. 3 is a block diagram of a first embodiment of the invention.

FIG. 3 is a block diagram of a first embodiment of the base transceiver station BTS of a cell 10 of the cellular mobile radio system 1 of the invention.

The base transceiver station BTS includes:

three antennas $A_1$, $A_2$ and $A_3$ for transmitting and receiving high-frequency radio signals to and from sectors 11, 12 and 13, respectively, of cell 10, three transmitters $TX_1$, $TX_2$ and $TX_3$ whose outputs are connected to the antennas A1, A2 and A3, respectively, a digital switch STX to which the inputs of the three transmitters $TX_1$, $TX_2$ and $TX_3$ are connected, a single baseband transmit processor device BBTX connected to the switch STX and to a BTS control device C which, under the control of a base station controller BSC responsible for the base transceiver station BTS, manages allocation of the various available time slots, three receivers $RX_1$, $RX_2$ and $RX_3$ the outputs of which are connected to the antennas $A_1$, $A_2$ and $A_3$, respectively, a digital switch SRX to which the inputs of the three receivers $RX_1$, $RX_2$ and $RX_3$ are connected, a single baseband receive processor device BBRX connected to the switch SRX and to the control device C.

The switches STX and SRX can instead be analog switches.

In accordance with the invention, the control device C knows the assignments of the various time slots. It therefore knows to which sectors the first three time slots 20, 21 and 22 reserved for the control channel must be permanently allocated. It also knows, where applicable, the assignment of the time slots intended for traffic channels and allocated permanently to given sectors. Finally, depending on the call traffic, managed by the BSC, it can allocate any "floating" time slots to the sectors in which such allocation is necessary. Thus the device C controls the switches STX and SRX so that the appropriate transmitter and receiver are activated in each time slot.

By virtue of the offset between the timebases of the various sectors, a time slot of given rank cannot be used at the same time by two different sectors. The first effect of this arrangement is to prevent the simultaneous transmission of signalling and control data; as a consequence of this, the offset between the timebases prevents simultaneous reception, in the same time slot, of signalling and control data from different mobiles.

This arrangement reduces the equipment overhead required at the base transceiver station of the cell 10. As is evident from FIG. 3, a single baseband processor device is needed for transmitting and another for receiving.

Figure 4:
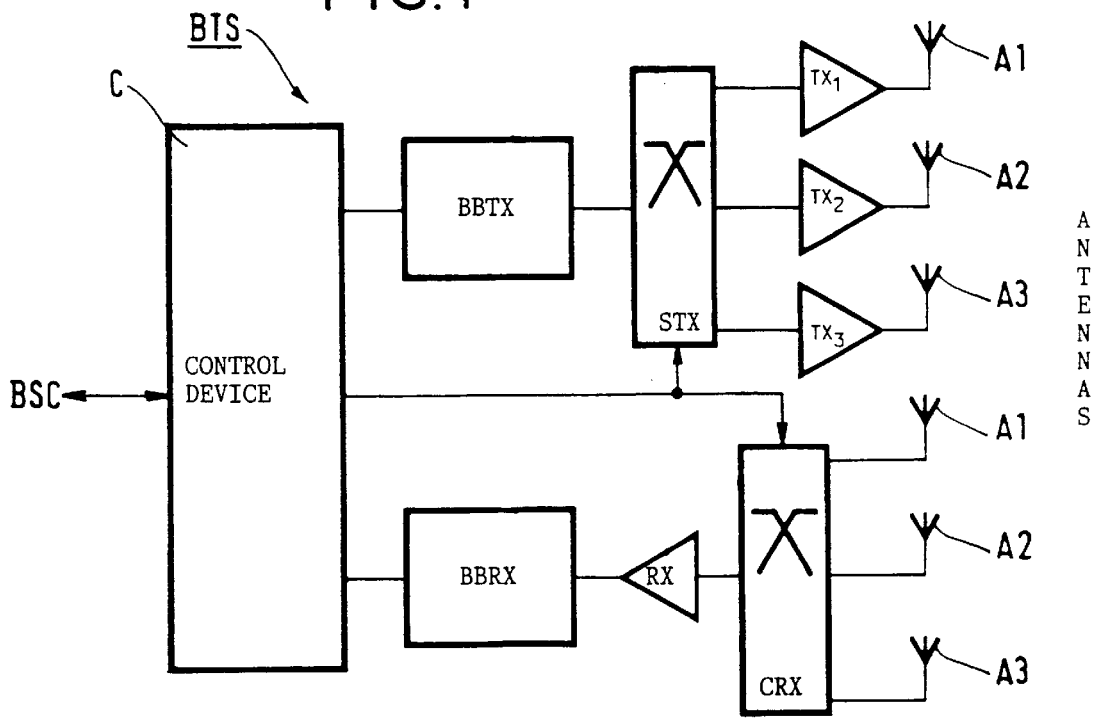
FIG. 4 is a block diagram of a second embodiment of the invention.

FIG. 4 is a block diagram of a second embodiment of a base transceiver station of a network of the invention.

The difference between this second embodiment and the first, described with reference to FIG. 3, lies in the receive part of the BTS, the transmit part remaining unchanged. Referring to FIG. 4, instead of using three receivers $RX_1$, $RX_2$, $RX_3$ a single receiver RX is used whose input is connected to an analog switch CRX connected to the antennas $A_1$, $A_2$ and $A_3$ and controlled by the control device C. Because the same time slot is not used at the same time by two different sectors, each receiver is not in use for at least one time slot. There is therefore no utility in employing three separate receivers and a single receiver switched to the appropriate antenna in each time slot is sufficient.

This simplification is not possible when it comes to transmission, however. As mentioned above, the BTS must transmit a signal continuously on the signalling and control channel of each sector. As also mentioned above, the period separating two repeats of this channel is greater than that between two repeats of the same traffic channel. Accordingly, time slots with a rank reserved for the control channel may remain unused for a greater or lesser period. The time slots of ranks reserved for the control channel and not used by the latter are therefore used to create new traffic channels.

One consequence of this could be that all the time slots of ranks reserved for the control channel are used for transmit traffic channels at all times. This is highly improbable in practise, however, especially in cells like those considered here, which are large area cells with very low traffic. This is why time slots of ranks reserved for the control channel can remain unused.

This represents a major problem: in the access and handover procedures it is essential for the mobile to be able to determine the frequency on which the broadcast control channel BCCH is transmitted. To this end it must "listen out" on all the frequencies of cells adjoining that in which it is located, and (for example) classify them in decreasing receive level order, adopting that with the highest level as the access or handover cell. It is therefore understandable that a signal must be transmitted continuously on the BCCH frequency. Accordingly, dummy bursts whose content is chosen to be very different from the content of normal bursts are sent on the BCCH frequency during unused time slots.

It is therefore clear why the three transmitters $TX_1$, $TX_2$ and $TX_3$ must be retained: they are essential for transmitting these dummy bursts.

The FIG. 4 embodiment has the same advantages as that described with reference to FIG. 3.

The access and handover procedures in a cellular mobile radio system of the invention can be carried out in the same way as in a prior art system.

The invention is naturally not limited to the embodiment just described.

In particular, one or more frequencies can be assigned to each sector, depending on traffic requirements. In this case, one transceiver per frequency is required. It is also possible for the system of the invention to use the principle of frequency hopping in which case the frequency used in each time slot is changed according to a predetermined plan. Only the BCCH frequency is always the same.

The invention can be used in any cellular mobile radio system, whether of the GSM type or not.

There is claimed:

1. A cellular mobile radio system comprising cells, wherein:

each of the cells is divided into P sectors;

each of the P sectors has a respective timebase;

the transmission of data in said cellular mobile radio system is by frames and uses a time division multiple access procedure in which each of the frames has N time slots;

each of the P sectors has a different one of the N time slots reserved as a respective control channel for transmitting signalling and control data;

the respective timebase of each of the P sectors is shifted a predetermined number of the N time slots relative to the respective timebase of each of the others of the P sectors within one of the cells, said predetermined number not being a multiple of N;

whereby the respective control channel of each of the P sectors is conveyed at a time different from the respective control channel of each of the others of the P sectors within the one of the cells.

2. The cellular mobile radio system according to claim 1, wherein:

P is less than N;

P time slots of the N time slots of each of the frames are reserved for the respective control channel of each the P sectors;

remaining ones of the N time slots, N-P in number, are traffic channels;

the traffic channels are associated with the P sectors in one of (1) a manner that is predetermined and invariant and (2) a dynamic manner according to call traffic demand.

3. A cellular mobile radio system comprising cells, wherein:

each of the cells is divided into P sectors;

each of the P sectors has a respective timebase;

the transmission of data in said cellular mobile radio system is by frames and uses a time division multiple access procedure in which each of the frames has N time slots;

each of the P sectors has a different one of the N time slots reserved as a respective control channel for transmitting signalling and control data;

the respective timebase of each of the P sectors is shifted a predetermined number of the N time slots relative to the respective timebase of each of the others of the P sectors within one of the cells;

each one of the cells has a respective base transceiver station for exchanging data with mobiles in said one of the cells; and the base transceiver station includes:
P antennas, one for each of the P sectors,
a receiver, adapted to be switched in each of the N time slots,
switching means for switching the receiver,
control means for controlling the switching means, the control means knowing the relationship of traffic channels of each of the frames to the P sectors at the antenna of one of the P sectors with which is associated one of the traffic channels or the respective control channel corresponding to the one of the N time slots concerned, to receive data from a mobile in the one of the P sectors, and
P transmitters, one for each of the P sectors, for transmitting data to be transmitted to the mobile in the one of the P sectors with which the mobile is associated, and for transmitting dummy bursts to the mobile when there is no data to be transmitted whereby the respective control channel of each of the P sectors is conveyed at a time different from the respective control channel of each of the others of the P sectors within the one of the cells.

4. The cellular mobile radio system according to claim 3, wherein:

said switching means comprises an analog switch.

5. The cellular mobile radio system according to claim 3, wherein:

said base transceiver station includes a single baseband transmit processor device connected to any of said P transmitters by said switching means controlled by said control means, said control means knowing the relationship of the traffic channels to the sectors.

6. The cellular mobile radio system according to claim 5, wherein:

said switching means comprises a digital switch.

7. A cellular mobile radio system comprising cells, wherein;

each of the cells is divided into P sectors;
each of the P sectors has a respective timebase;

the transmission of data in said cellular mobile radio system is by frames and uses a time division multiple access procedure in which each of the frames has N time slots;

each of the P sectors has a different one of the N time slots reserved as a respective control channel for transmitting signalling and control data;

the respective timebase of each of the P sectors is shifted a predetermined number of the N time slots relative to the respective timebase of each of the others of the P sectors within one of the cells; and in association with each of the cells and for the purposes of exchanging data with mobiles in said cell, said cellular mobile radio system comprises a base transceiver station including:
P antennas, one for each of the P sectors,
P receivers, one for each of the P sectors, for receiving data from a mobile in one of the P sectors,
P transmitters, one for each of the P sectors, for transmitting data to be transmitted to the mobiles in the respective sectors with which the mobiles are associated, and for transmitting dummy bursts to the mobiles when there is no data to be transmitted,
first switching means for connecting a single baseband transmit processor device to any of said P transmitters,
control means of said base transceiver station for controlling said first switching means, said control means knowing the relationship of the P sectors to traffic channels, and
second switching means for connecting a single baseband receive processor device to any of said P receivers, said second switching means being controlled by said control means;

whereby the respective control channel of each of the P sectors is conveyed at a time different from the respective control channel of each of the others of the P sectors within the one of the cells.

8. The cellular mobile radio system according to claim 7, wherein:

said first switching means and said second switching means each comprise a digital switch.

* * * * *